United States Patent
Demarquilly et al.

(10) Patent No.: US 6,454,326 B2
(45) Date of Patent: Sep. 24, 2002

(54) DEVICE FOR PROTECTING A VEHICLE AGAINST IMPACT

(75) Inventors: Francis Demarquilly, Lagord (FR); Jean-Jacques Laporte, La Rochelle (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/814,947

(22) Filed: Mar. 23, 2001

(30) Foreign Application Priority Data

Mar. 23, 2000 (FR) .............................. 00 03730

(51) Int. Cl.$^7$ .............................................. B60R 19/02
(52) U.S. Cl. .................... 293/107; 293/118; 105/392.5; 280/770
(58) Field of Search ................................. 293/107, 108, 293/110, 118; 105/392.5; 280/770

(56) References Cited

U.S. PATENT DOCUMENTS 5,431,463 A    7/1995   Chou 6,039,349 A  *  3/2000   Laporte et al. ......... 293/107 X

FOREIGN PATENT DOCUMENTS

| DE | 2 023 068 | 1/1971 |
| DE | 196 24 328 | 1/1998 |
| EP | 0 816 178 | 1/1998 |
| FR | 2 420 456 | 10/1979 |
| FR | 2 764 854 | 12/1998 |
| GB | 1 376 860 | 12/1974 |
| WO | 98/50254 | 11/1998 |

* cited by examiner

*Primary Examiner*—Joseph D. Pape
(74) *Attorney, Agent, or Firm*—Sughrue Mion, PLLC

(57) ABSTRACT

A device for protecting a vehicle against impact, the device comprising an inflatable element presenting, once inflated, a bearing surface in contact with the region of the vehicle to be protected, and an impact surface designed to receive the impact directly, wherein said inflatable element includes localized flexible connection elements connecting holding points of the impact surface with fastening points of the bearing surface.

7 Claims, 1 Drawing Sheet

DEVICE FOR PROTECTING A VEHICLE AGAINST IMPACT

The invention relates to a device for protecting a vehicle against impact, and more particularly to a device comprising an inflatable element which, once inflated, presents a general shape that fits closely over the region of the vehicle to be protected. The protection device of the invention preferably applies to the railway industry, in particular to trams or the like, for which the inflatable protection element is particularly bulky.

BACKGROUND OF THE INVENTION

Document FR 2 420 456 discloses using an inflatable protective cushion at the front of a railway vehicle to dampen shock during impact with a human being or any other obstacle. However, when the direction of impact is not perpendicular to the tangential plane of the inflatable element, such a large-volume inflatable cushion has the drawback of deforming in uncontrolled manner and can slide laterally relative to the front face of the vehicle, possibly sliding past the impact zone without providing its damping function.

It is known from document FR 2 764 854 to remedy that drawback by using a protective device including a plurality of inflatable elements disposed side-by-side and having a general shape that enables them to interfit laterally with both adjacent inflatable elements. The inflatable elements that are not directly subjected to the impact thus block deformation of the inflatable element(s) that are directly subjected to the impact and prevent the inflatable elements from moving out of the way. However, such a device has the drawback of being complex to implement.

OBJECT AND SUMMARY OF THE INVENTION

The object of the present invention is thus to propose a device for protecting a vehicle against impact, the device comprising an inflatable element which has good lateral stability against impact, in such a manner as to prevent the inflatable element from moving laterally when the direction of impact is not perpendicular to the tangential plane of the inflatable element, and which is simple and cheap to make.

The invention provides a device for protecting against impacts, the device comprising an inflatable element presenting, once inflated, a bearing surface in contact with the region of the vehicle to be protected, and an impact surface designed to receive the impact directly.

In the invention, the inflatable element includes localized connection elements connecting holding points of the impact surface with fastening points of the bearing surface.

According to another characteristic of the invention, the fastening points are disposed on the bearing surface in such a manner that the connection elements slope relative to the normal at the bearing surface.

According to yet another characteristic of the invention, a plurality of fastening points, spaced apart over the bearing surface, are connected by connection elements to the same holding point, or to a plurality of holding points that are close to one another.

BRIEF DESCRIPTION OF THE DRAWING

The objects, characteristics, and advantages of the present invention will be better understood on reading the following description of an embodiment of the invention, given by way of non-limiting example, and with reference to the accompanying drawing, in which.

MORE DETAILED DESCRIPTION

Figure 1:
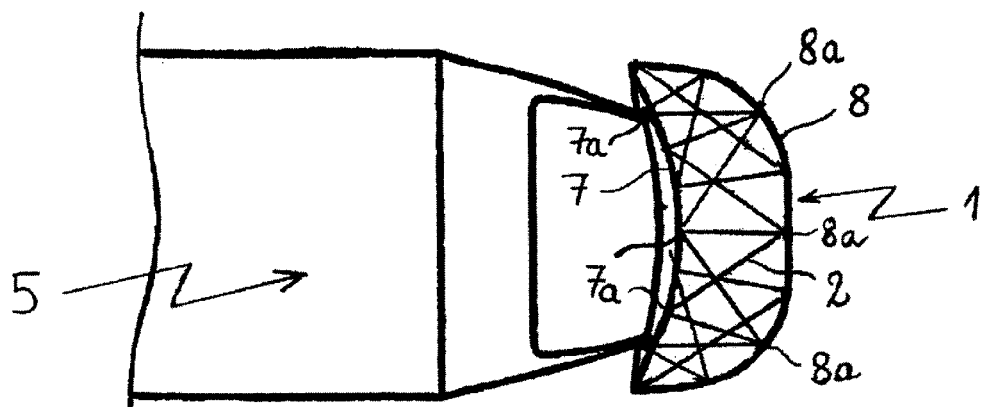
FIG. 1 is a diagrammatic view from above of a railway vehicle fitted with a protection device of the invention, when the inflatable element is in the deployed position, shortly before impact.

To make the drawing easier to understand, only the elements necessary for understanding the invention are shown. In addition, the skin of the inflatable element of the protection device is shown as being transparent in FIGS. 1 to 3 in order to show the elements contained inside the inflatable element and to facilitate understanding of the invention.

FIG. 1 shows a railway vehicle 5 of the tram type fitted with a device for protecting it against impacts, the device being constituted by a large-volume inflatable element 1 including a fabric skin which, once deployed, is a close fit over the front face of the vehicle to be protected.

In FIG. 1, the inflatable element 1 presents a bearing surface 7 resting in contact with the front face of the tram 5, and an impact surface 8 facing towards the front of the vehicle.

The inflatable element 1 contains localized lines 2 made of non-stretch fabric, connecting holding points 8a of the impact surface 8 to fastening points 7a of the bearing surface 7, the lines 2 being fastened to the points 7a and 8a by fixing means that provide good resistance to traction forces, e.g. by stitching or adhesion.

Each holding point 8a is connected by a line 2 to at least one fastening point 7a, the fastening point being selected on the bearing surface 7 in such a manner that the line 2 slopes relative to the normal at the bearing surface 7. Each holding points 8a is advantageously connected to two or three fastening points 7a disposed on the bearing surface 7 in such a manner that the lines 2 slope in complementary directions, ensuring lateral and vertical stabilization of the holding point 8a.

The bearing surface 7 of the inflatable element 1 is preferably held on the front face of the tram 5 by fastening straps (not shown), the fastening straps preferably being disposed at the lateral ends of the front face of the tram 5.

The operation of the protection device is described below:

Under normal working conditions, the inflatable element 1 is in a folded state at the front of the tram 5, inside a compartment provided for this purpose.

When the risk of a collision is detected, either automatically, or following the intervention of a driver, compressed gas is injected into the inflatable element 1, which, under the pressure, deploys instantly in front of the front face of the tram 5. The protection device is thus ready to cushion the impact against any object, the fabric skin of the inflatable element 1 is porous, or has calibrated openings, enabling the air to be expelled progressively during impact.

Figure 2:
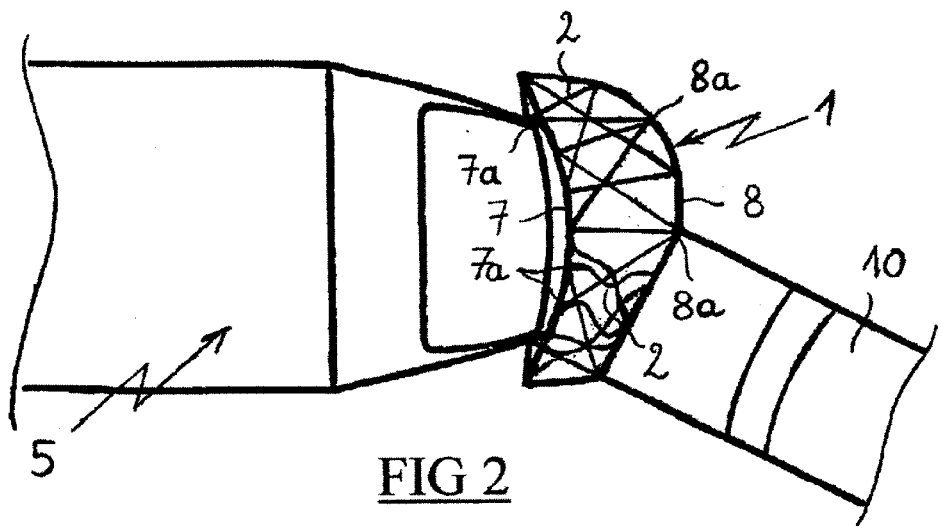
FIG. 2 is a view similar to FIG. 1 at the moment of diagonal impact with a vehicle.

In FIG. 2, when a vehicle 10 hits the inflatable element 1 on one side of the tram 5, the inflatable element 1 deforms locally at its impact surface 8. The displacement of the impact surface 8 is accompanied by slackening of the lines 2 that slope so as to be subjected to compression forces, and by stiffening of the lines 2 that are subjected to traction forces. The stiffening of the lines 2 thus enables the impact surface 8 to be displaced towards the axis of the tram 5, by said lines pivoting about their fastening points 7a, but limits the lateral and vertical displacement of the impact surface 8, thus preventing the inflatable element 1 from moving out of the way.

Figure 3:
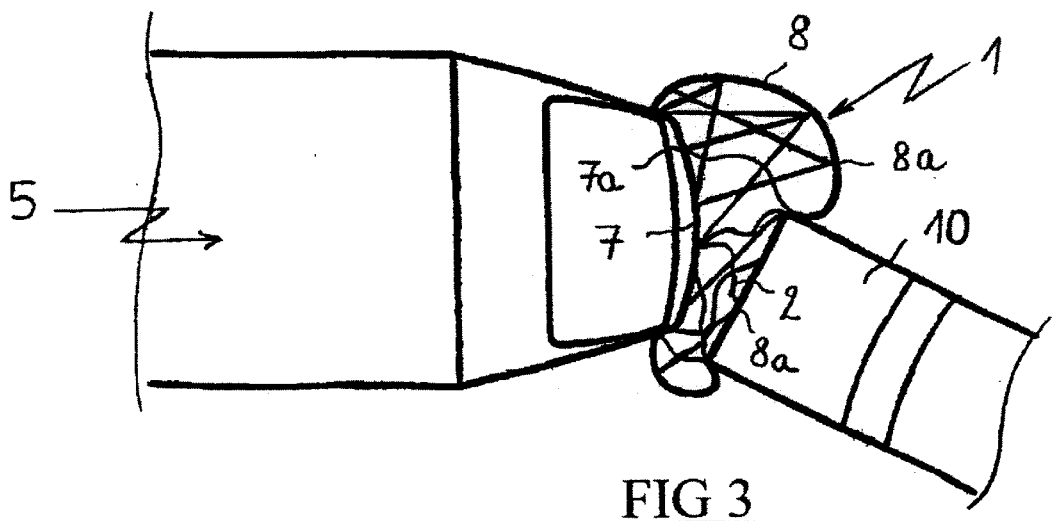
FIG. 3 is a view similar to FIG. 2 a few moments later.

In FIG. 3, when the vehicle 10 continues to advance the inflatable element 1 is compressed even further but remains stabilized in the impact zone of the vehicle, thereby enabling the impact to be dampened.

Naturally, the invention is not limited to the embodiment described and shown which has been given only by way of example.

Thus, in the example shown, the connection lines are disposed inside the skin of the inflatable element. However, in a variant of the invention (not shown), the connection lines could be disposed outside the skin of the inflatable element, e.g. passing over the length of the surface of the inflatable element. Such a variant can be made using a large-mesh net inside which the inflatable element is deployed.

Thus, the connection lines could be replaced by connection elements such as straps or any other equivalent means.

What is claimed is:

1. A device for protecting a vehicle against an impact, including an inflatable element, once inflated, comprising:
    a bearing surface in contact with a region of the vehicle to be protected, said bearing surface having a plurality of fastening points;
    an impact surface designed to receive the impact directly, said impact surface having a plurality of holding points; and
    a plurality of localized connection elements that connect said plurality of holding points to said plurality of fastening points.

2. A vehicle protection device according to claim 1, wherein said plurality of fastening points are disposed on the bearing surface in such a manner that the plurality of localized connection elements are sloped relative to a normal angle to the bearing surface.

3. A vehicle protection device according to claim 2, wherein said plurality of fastening points, spaced apart over the bearing surface, are connected by the plurality of localized connection elements to the same holding point, or to a plurality of holding points that are close to one another.

4. A protection device according to claim 1, wherein said connection elements do not stretch.

5. A protection device according to claim 4, wherein said plurality of localized connection elements are lines.

6. A protection device according to claim 5, wherein said plurality of localized connection elements are straps.

7. A protection device according to claim 1, wherein said plurality of localized connection elements are disposed inside the inflatable element.

* * * * *